UNITED STATES PATENT OFFICE 2,143,322

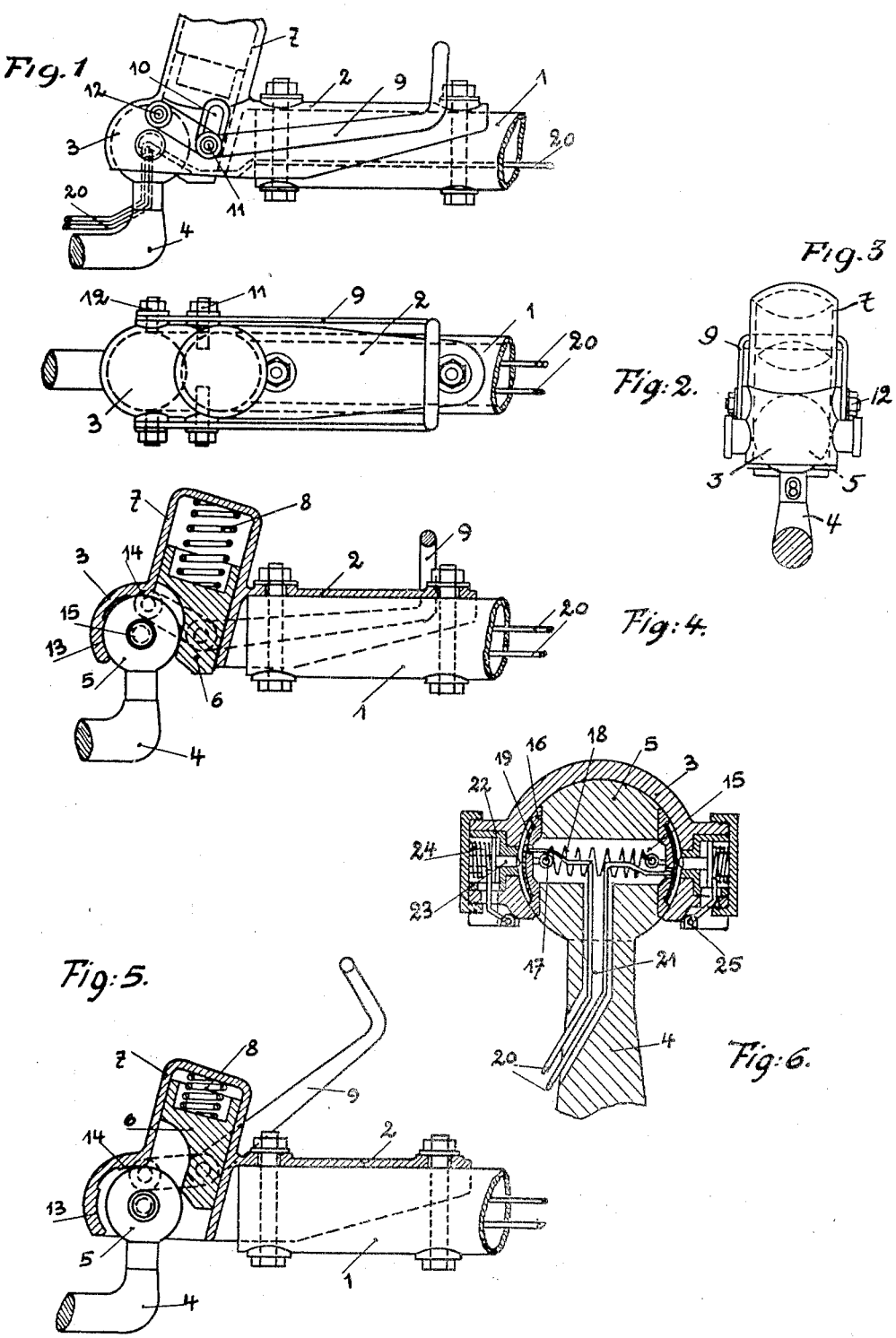

BALL JOINT COUPLING FOR TRAILERS OF MOTOR VEHICLES

Franz Knöbel, Jr., Wiedenbruck, Germany

Application September 4, 1936, Serial No. 99,433
In Germany October 20, 1934

1 Claim. (Cl. 289—33.15)

The known ball joint couplings for trailers of motor vehicles in which the ball member is held in the ball cup member by means of a locking element, are open to the objection that is is often forgotten to operate the locking lever with the result that the trailer can easily become detached and cause damage.

This objection is overcome by the invention, the fundamental idea of which is to allow a spring to act on the locking element which is slidable in a guide preferably at an angle to the direction of pull, this spring, which is also accommodated in the guide casing of the locking element, being tensioned during the opening of the locking element for the purpose of introducing the ball member of the tractor into the cup member, by means of a hand lever mounted on the coupling housing and engaging by means of an arm laterally in the locking element, and consequently, when the handle is released, this spring automatically brings the locking element into its locking position and blocks the ball member. The ball cup is according to the invention also constructed in such a manner that it bears against the ball member at two points uniformly distributed relatively to the locking element so as to avoid the rattling noises which were always present in the known ball joint couplings. According to another feature of the invention insulated contacts, electrically connected with the source of current of the vehicle, are provided at two opposite sides of the ball member and contact pins insulated and resiliently mounted in the cup member and conected with the "stop" and tail lights of the trailer, slide over these contacts, so that, when the trailer is being automatically coupled with the motor vehicle, the electric connection between the trailer and the motor vehicle is established at the same time.

An embodiment of the invention is illustrated by way of example in the acompanying drawing, in which:—

Fig. 1 shows the coupling in side elevation.
Fig. 2 is a top plan view of Fig. 1.
Fig. 3 is a front end view of Fig. 1.
Fig. 4 shows the coupling in longitudinal section in closed condition.
Fig. 5 is a similar view to Fig. 4, showing the coupling in open condition.
Fig. 6 is a vertical section through the ball coupling taken transversely to the direction of pull.

The front end of the coupling housing 2 attached to the hitch shaft 1 is constructed as a hemispherical cup 3 which engages over a ball pin 5 mounted on the draft rod 4 of the motor vehicle. According to the invention this ball joint coupling is automatically locked. For this purpose the wedge 6 constructed as locking member is mounted in the housing 7 serving as guide slidable against the action of a spring 8, and it can be brought into its open position (Fig. 5) by a hand lever 9, thereby tensioning the spring 8, whereas, when the handle 9 is released, the spring 8 presses the locking member 6 into its locking position (Fig. 4) and holds it in this position. The locking wedge 6 is oscillatably mounted in holes in the hand lever 9 by means of pins 11 engaging in guides 10 (Fig. 1) in the housing 2, the lever itself being rotatable about pins 12 mounted on the housing 2.

The ball cup 3 embracing the ball pin 5 is constructed in such a manner that it bears against the ball only at two points 13 and 14 which are spaced relatively to the spring loaded locking wedge 6 in such a manner that the three supporting points of the ball pin are uniformly distributed on the periphery of the embraced ball (see Fig. 4). By these three supporting points the ball pin is absolutely reliably guided and is free from rattling even when the points in question have worn in the course of time, as the strong spring 8 re-adjusts the locking wedge 6 corresponding to the wear. The hollow spaces formed by this construction of the ball cup can be filled with felt or the like saturated with oil.

The ball 5 has a horizontal bore 15 (Fig. 6) extending transversely to the direction of pull and terminates in two diametrically opposite recesses in the ball surface, which recesses are each filled with an insulating piece 16 preferably made of Bakelite. The insulating pieces 16 can easily be fitted and are held in position by means of a spiral spring 18 extending through the bore 15 and hooked into eyes 17 one on the side of each insulating piece, whereas flat or curved contact discs 19 are fixed one on the outer side of each insulating piece. Electric leads 20 extending through a bore 21 in the ball 5 and in the rod 4 are connected to these contact discs 17 and to their terminals in the motor vehicle.

Contact pins 23 supported by springs 24 are mounted in holders 22 of insulating material arranged opposite the contact discs in the hemispherical cup 3 embracing the ball 5, so that these pins slide on the contact discs 19. The two contact pins 23 are electrically connected with the "stop" and "tail lights" of the trailer by means of leads laid in grooves 25 in the housing 2, so that, when the contact pins 23 bear against the contact discs 19, the circuit is closed.

The trailer coupling and the electric connections with the motor vehicle are manipulated and operate in the following manner.

For coupling the trailer with the motor vehicle, the hand lever 9 is raised and the locking wedge 6 is thereby pressed into the housing 7 until the ball pin 5 of the motor vehicle can be introduced into the hemispherical cup 3, the springs being at the same time compressed. The hand lever 9 is then released, whereupon the spring 8 automatically presses the locking wedge 6 into the locking position (Fig. 4) and establishes an absolutely reliable connection between the motor vehicle and the trailer. The trailer cannot possibly become uncoupled by vibrations during the travel as the ball 5 cannot shift the locking member 6.

The guiding surface for the locking member 6 may be constructed and arranged in any suitable manner, but its arrangement at an angle to the direction of pull presents the advantage that, although no locking pawls or the like are provided, the ball 5 cannot shift the locking member in any of the thrust directions coming into question.

During the introduction of the ball 5 into the ball cup, the resilient contact pins 23 automatically come into contact with the contact discs 19 and thus establish the connection between the tail light and stop light on the trailer and the source of current in the motor vehicle, so that the circuit is automatically closed by the hitching up of the trailer.

The arrangement of the contact discs 19 on the extremities of the horizontal diameter of the ball 5 extending transversely to the direction of pull presents the advantage that these points of the periphery of the ball are least stressed during travel. The contact discs 19 are preferably made so large that they remain in contact with the contact pins 23 during veering movements such as normally occur, and only move out of contact with the pins in very sharp curves and veering movements. It is evident that a sufficiently large insulated space must be provided between the ball surface and the contact discs to avoid short-circuiting.

I claim:—

In a ball joint coupling for tractors of motor vehicles, comprising in combination a ball pin on one vehicle, a ball cup on the other vehicle adapted to receive said ball pin, a housing formed on said ball cup at an acute angle to the direction of pull, a bracket carried by the housing, a shaft to which the bracket is attached, a locking wedge slidable in said housing, a spring in said housing adapted to press said wedge outwards to lock said ball pin, a hand lever articulated to said housing, said housing having a slot therein extending lengthwise thereof, a pin extending through said slot for connecting the hand lever to the sliding wedge and said lever being engaged to said shaft when the sliding wedge is in locking position engaged with the ball pin.

FRANZ KNÖBEL, Junior.